United States Patent [19]
Hayakawa

[11] Patent Number: 5,789,836
[45] Date of Patent: Aug. 4, 1998

[54] MOTOR HAVING DYNAMIC PRESSURE BEARING DEVICE

[75] Inventor: Masamichi Hayakawa, Shimosuwa-machi, Japan

[73] Assignee: Sankyo Seiko Mfg. Co., Ltd., Nagano, Japan

[21] Appl. No.: 622,281

[22] Filed: Mar. 25, 1996

[30] Foreign Application Priority Data

| Mar. 25, 1995 | [JP] | Japan | 7-091551 |
| Mar. 25, 1995 | [JP] | Japan | 7-091552 |
| Mar. 25, 1995 | [JP] | Japan | 7-091553 |

[51] Int. Cl.⁶ .................... H02K 7/08; F16C 33/82
[52] U.S. Cl. ............... 310/90; 310/156; 384/107; 384/133
[58] Field of Search .................. 310/90, 42, 67 R, 310/156; 384/112, 113, 114, 123, 292; 252/565, 11, 12, 62.52, 62.54; 508/485, 501

[56] References Cited

U.S. PATENT DOCUMENTS

| 4,169,801 | 10/1979 | Schlicht | 252/51.5 |
| 4,335,006 | 6/1982 | Bandlish et al. | 252/49.7 |
| 4,534,873 | 8/1985 | Clark | 252/32.7 |
| 4,652,149 | 3/1987 | Nakaoka et al. | 384/100 |
| 4,956,122 | 9/1990 | Watts et al. | 252/565 |
| 5,012,023 | 4/1991 | Venier et al. | 585/20 |
| 5,032,751 | 7/1991 | Morita | 310/90.5 |
| 5,057,373 | 10/1991 | Tokunaga et al. | 428/413 |
| 5,223,161 | 6/1993 | Waynick | 252/25 |
| 5,325,006 | 6/1994 | Uno et al. | 310/90 |
| 5,357,163 | 10/1994 | Minakuchi et al. | 310/90 |
| 5,372,432 | 12/1994 | Ishikawa | 384/133 |
| 5,414,103 | 5/1995 | Cracknell et al. | 558/90 |
| 5,417,507 | 5/1995 | Uno et al. | 384/107 |
| 5,493,161 | 2/1996 | Uno et al. | 310/156 |
| 5,498,355 | 3/1996 | Perozzi et al. | 252/49.6 |
| 5,559,382 | 9/1996 | Oku et al. | 310/90 |
| 5,562,851 | 10/1996 | Schriver et al. | 508/462 |
| 5,587,432 | 12/1996 | Scattergood | 525/327.6 |

*Primary Examiner*—Thomas M. Dougherty
*Assistant Examiner*—Tran N Nguyen
*Attorney, Agent, or Firm*—Oblon, Spivak, McClelland, Maier & Neustadt, P.C.

[57] ABSTRACT

A motor having a dynamic pressure bearing device equipped with a rotor having a driving coil or a driving magnet, and a stator having the other of the driving coil or the driving magnet, the dynamic pressure bearing device comprising a shaft fixed to the rotor or the stator and having a dynamic pressure surface on its outer surface, a bearing body fixed to the other of the rotor or stator and having a dynamic pressure surface on its inner surface which is positioned to circumferentially confront the outer surface of the shaft body, a dynamic pressure generating groove formed on at least one side of both the dynamic pressure surfaces, and a lubricating fluid in which magnetic particles are dispersed in a base oil solvent containing an amine anti-gelling agent interposed between both of the dynamic pressure surfaces.

3 Claims, 1 Drawing Sheet

MOTOR HAVING DYNAMIC PRESSURE BEARING DEVICE

BACKGROUND OF THE INVENTION

The present invention relates to a motor having a dynamic pressure bearing device which rotatably supports a rotating member against a fixed member by the dynamic pressure of a bearing fluid.

DESCRIPTION OF THE BACKGROUND

In recent years, attention has been directed to devices such as motors which contain various kinds of rotating members such as polygon mirrors, magnetic discs, optical discs, and the like, which are rotated at high speed. In these devices, it has been proposed to use dynamic pressure bearings which contain a magnetic lubricating fluid. The magnetic fluid is a colloidal solution of fine ferromagnetic particles stably dispersed in a liquid solvent. In view of the strong ferromagnetic property that the liquid itself shows, it is usually used as a sealing means in combination with ball bearings in many cases. However, a dynamic pressure bearing, which has a magnetic fluid as a lubricating fluid of the bearing has great prospects because dynamic pressure bearings exhibit superior high speed rotation stability and stillness, in comparison to conventional ball bearings. Dynamic pressure bearings having a magnetic fluid have been proposed for special use. For example, Japanese Laid-Open Patent Application No. 88223/1985 discloses a device having a fluid which acts as both a lubricating fluid for generating dynamic pressure and a magnetic fluid for magnetic sealing.

A magnetic fluid composition has also been used for a sealing effect because of its advantageous high sealing properties at about $10^{-6}$ Torr, which can be obtained at high rotating speeds. However, a magnetic fluid composition which simultaneously, satisfies both functions as a lubricating fluid and a magnetic fluid sealant (low abrasion characteristics and lifetime characteristics, such as low volatility and high temperature resistance) has not yet been developed (see PETROTECH, Vol. 12, No. 12 (1989)).

However, in the devices as mentioned above, the magnetic fluid component must have both low volatility as a sealant and low viscosity to diminish bearing loss. That is, the bearing portion is exposed to far higher shearing forces and higher temperatures than the sealing portion. In fact, sometimes active metal surfaces are formed by contact and wear of metals with each other at the starting and stopping operations.

Thus, there is a need for the development of a lubricating fluid composition for dynamic pressure bearings which achieves not only high sealing effects, but also high lubricity and long lifetime characteristics. In order for a fluid to be useful as both a lubricating fluid for generating dynamic pressure and a magnetic fluid for magnetic sealing, it is essential to prevent deterioration of the fluid over long periods of time, particularly to prevent gelation. It is known to add 0.1 to 0.5% by weight of a phenolic, aminic or sulfur containing antioxidant, or the like to a lubricating oil in order to improve the oxidation resistance of the fluid and therefore the lifetime of the fluid. However, it is not known what kinds of materials should be added in what kind of manner to a fluid in order to prevent gelation of a magnetic fluid. Japanese Laid-Open Patent Application No. 105093/1984, discloses that an antioxidant can be added to a magnetic fluid in order to prevent deterioration of a magnetic fluid by oxidation, but there is no disclosure of the prevention of gelation of the fluid. A need therefore continues to exist for a magnetic fluid of improved stability under operating conditions and gelation resistance.

SUMMARY OF THE INVENTION

Accordingly, one object of the present invention is to provide a motor which contains a dynamic pressure bearing device as a component, wherein the lubricating fluid component of the device exhibits improved gelation resistance and, as a result, the lifetime reliability of the motor can be improved for long periods of use.

Briefly, this object and other objects of the present invention as hereinafter will become more readily apparent can be attained by a motor having a dynamic pressure bearing device equipped with a rotor having a driving coil or a driving magnet, and a stator having the other of the driving coil or the driving magnet, said dynamic pressure bearing device comprising:

a shaft fixed to the rotor or the stator and having a dynamic pressure surface on its outer surface, a bearing body fixed to the other of the rotor or stator and having a dynamic pressure surface on its inner surface which is positioned to circumferentially confront the outer surface of the shaft body, a dynamic pressure generating groove formed on at least one side of both the dynamic pressure surfaces, and a lubricating fluid in which magnetic particles are dispersed in a base oil solvent containing an amine anti-gelling agent interposed between both of the dynamic pressure surfaces.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein the Figure is a semi-vertical sectional view showing an example of a HDD (Hard Disk Drive) motor having the dynamic pressure bearing device of the present invention.

DETAILED DESCRIPTION OF THE PREFERRED EMBODIMENTS

Figure 1:
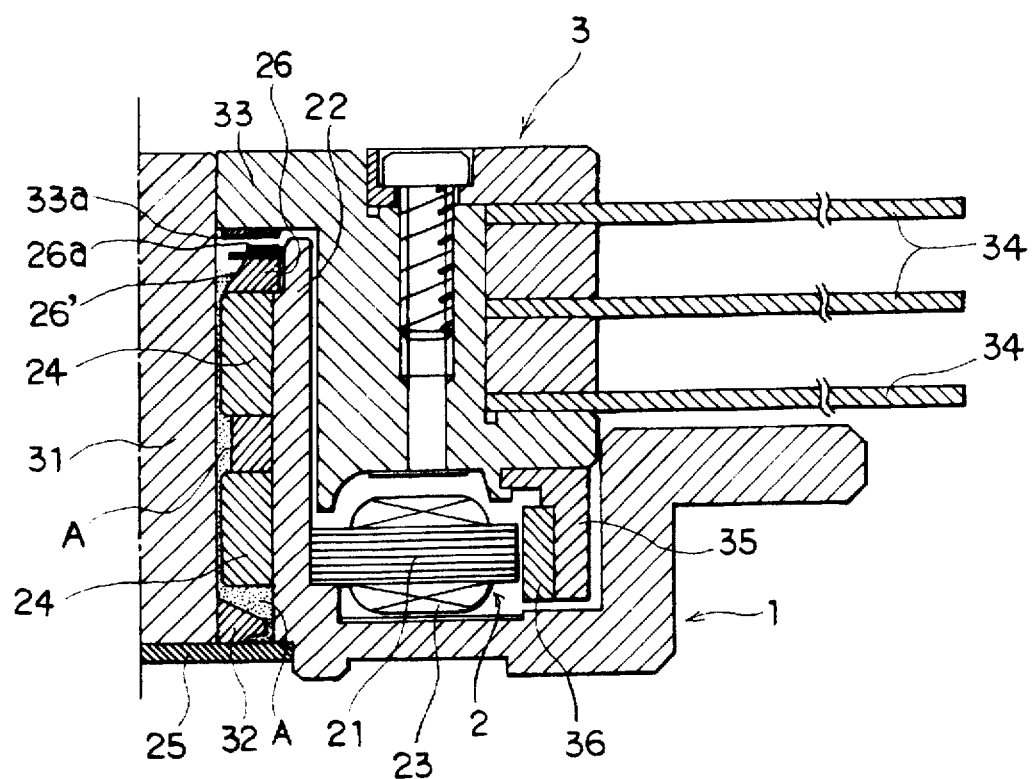

As a result of research, it has now been found that in view of the structural complexity of magnetic fluids, particularly in view of interaction of the fluid with a surfactant, the action of an antioxidant added to a magnetic fluid is different from the action of an antioxidant added to a lubricating agent in general. And when a specific kind of antioxidant is added to a magnetic fluid, its gelation can be sufficiently prevented. Furthermore, in order to obtain a sufficient gelation prevention effect of the lubricating fluid composition of a dynamic pressure bearing, it is necessary for the fluid to contain an antioxidant which:

1) is soluble in a base oil and does not precipitate even when a magnetic fluid has a surfactant added thereto, 2) exhibits a diminished tendency to increase in viscosity, 3) exhibits a low volatility weight loss, 4) does not result in precipitation of a reaction product, and the like.

In order to solve the problems detailed above, the present invention provides a lubricating fluid composition for dynamic pressure bearings which comprises a fluid in which fine magnetic particles are dispersed in a base oil solvent and which contains an amine anti-gelling agent.

A motor has a dynamic pressure bearing device which includes a rotor having a driving coil and a driving magnet, and a stator which has the other of the driving coil and the driving magnet. The dynamic pressure bearing device comprises a shaft which is fixed to either the rotor or the stator and has a dynamic pressure surface on the outer surface thereof, a bearing body fixed to the other of the rotor and stator and has a dynamic pressure surface on the inner surface thereof which is provided to circumferentially confront the outer surface of the shaft body, a dynamic pressure generating groove formed on at least one side of both the dynamic pressure surfaces, and a lubricating fluid in which magnetic particles are dispersed in a base oil solvent which also contains an amine anti-gelling agent interposed between the dynamic pressure surfaces.

The motor having the dynamic pressure bearing device of the present invention achieves good characteristics with a simple structure. That is to say, improvement in lifetime characteristics and reliability of the motor having a dynamic pressure bearing device, where a single fluid is used both as a lubricating fluid for dynamic pressure generation and a fluid for magnetic sealing, can be achieved. Physical properties of a magnetic lubricating fluid for dynamic pressure bearings, particularly high temperature gelation resistance are improved by applying a lubricating agent to which an amine anti-gelling agent, for example, an amine antioxidant is added to the base oil solvent, while maintaining good viscosity and volatility loss characteristics. Further, by adding an anti-gelling agent in a predetermined amount, the lifetime and reliability of a motor having a dynamic pressure bearing can be further improved.

The motor having the dynamic pressure bearing device of the present invention exhibits enhanced lifetimes of 5 times or more in comparison to the conventional dynamic pressure bearing motor.

In the present invention, an amine anti-gelling agent such as an amine antioxidant of the likes of alkyldiphenylamine (trade name; Irganox L01, L57, L06, etc.) and phenyl-α-naphthylamine (trade name; Irganox L05, etc.) are used as additives to the base oil. Alkyldiphenylamine and phenyl-α-naphthylamine are suitable in view of volatility requirements and are compatible with the base oil.

Based on 100 parts by weight of the base oil solvent of the invention, the base oil solvent preferably contains 1 to 15 parts by weight of the amine antigelling agent, whose viscosity is preferably 100 cp or lower and whose saturation magnetization is preferably 150 gauss or more. As to the magnetic particle component, if the amount of the fine magnetic particles in the fluid is less than 25 parts by weight, the resulting composition does not reach a magnetization of 150 gauss, while if it exceeds 35 parts by weight, the viscosity increases. Also, various additives such as a rust preventive, a viscosity index improving agent, a metal inactivating agent, and the like may be added to the base oil solvent which ingredients are the same materials added to lubricating oils.

As the anti-gelling agent, an amine antioxidant is used, as well as one or more kinds of antioxidant selected from the group consisting of a phenolic antioxidant, which acts as a free group chain transfer reaction-terminating agent, and a sulfur containing antioxidant which acts as a peroxide decomposing agent in admixture. When these components are mixed, a preferred combination is an amine antioxidant and a phenolic antioxidant in a formulation ratio, based on 100 parts by weight of the base oil solvent, of preferably 1 to 10 parts by weight of the amine antioxidant and 1 to 10 parts by weight of the phenolic antioxidant, from the view point of solubility in the base oil solvent. The phenolic antioxidant is effective only when it is used in combination.

Suitable phenolic antioxidants include 2,6-di-t-butylphenol (trade name; Ethyl 701, Irganox L108, etc.), 4,4'-methylenebis (2,6-di-t-butyl phenol) (trade name; Ethyl 702, Irganox L109, etc.), 2,6-di-t-butyl-4-ethylphenol (trade name; Ethyl 724, etc.) and 2,6-di-t-4-n-butylphenol (trade name; Ethyl 744, etc.). In view of volatility and compatibility with the base material, 4,4'-methylenebis(2,6-di-t-butylphenol) is preferred.

A suitable base oil solvent of the invention comprises a mixture of a hydrogenated poly-α-olefin and a polyol ester oil. By using a lubricating fluid composition having a base oil solvent containing the hydrogenated poly-α-olefin and the polyol ester, physical properties such as viscosity, volatility, high temperature gelation, and the like can be improved.

The hydrogenated poly-α-olefin can be obtained, for example, by hydrogenating a polymerized material obtained by polymerizing 1-decene, isobutylene, or the like. Preferably, the polymerized materials have a number average molecular weight of about 200 to 1600, but in view of the volatility factor, polymerized materials having a number average molecular weight of about 400 are preferred. Hydrogenation may not be carried out completely but, when the degree of the hydrogenation is low, the resulting material is likely to deteriorate.

The polyol ester has a structure, for example, in which a polyvalent alcohol such as neopentyl glycol (NPG), trimethylolpropane (TMP), pentaerythritol (PE), or the like is reacted with a long chain or branched $C_{5-18}$ aliphatic acid. Other polyol esters include trimethylolpropane-mixed esters of the formula: $CH_3$—$CH_2$—C—$(CH_2OOCR)_3$ wherein R is a $C_{5-20}$ alkyl group. More specifically, a suitable polyol ester is a mixed trimethylolpropane ester of valeric acid and heptanoic acid (produced by Shin-nittetsu Kagaku K.K.; trade name: HATCOL 2915, 2925, 2937, etc.) or a mixed ester oil of trimethylolpropane with decanoic acid or heptanoic acid (produced by Shin-nittetsu Kagaku K.K.; trade name: HATCOL 2938, etc.) Furthermore, a viscosity temperature index improving agent can be added to the base oil solvent as a component. Suitable viscosity temperature index improving agents include a polymethacrylate of the formula:

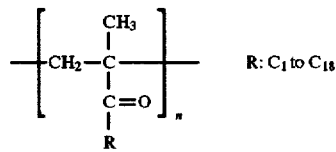

R: $C_1$ to $C_{18}$

The average molecular weight of the agent is 20,000 to 1,500,000, but in view of the relationship between the viscosity index improving effect and shear stability, viscosity temperature index improving agents having an average molecular weight in the range of 20,000 to 50,000 such as Acrub 702, 707, etc. produced by Sanyo Kasei K.K. are preferred. These polymers are difficult to handle during production and formulation, and accordingly, are generally diluted with a low viscosity mineral oil. However, when diluted with a low viscosity mineral oil, problems arise with respect to volatility, dispersion stability, and the like of the base oil solvent, so that a hydrogenated poly-α-olefin is preferably used as a diluent.

Suitable viscosity temperature index improving agents also include a polybutene type (polyisobutylene type) which has the formula below (for example, Tetrat, etc. produced by Nippon Sekiyu Kagaku K.K.)

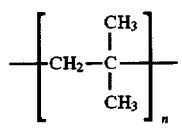

The average molecular weight of the material is 5,000 to 300,000, but when a hydrogenated poly-α-olefin is used as a diluent, the agent is preferred for the same reason as mentioned above.

A metal inactivating agent may also be added to the base oil solvent as a component of the fluid.

Suitable metal inactivating agents include benzotriazole and a derivative thereof, but imidazoline and pyrimidine derivatives may also be used. Many of these compounds, having a metal inactivating effect, have N-CN bonds and have both the action of forming an inactive film on the surface of a metal and an antioxidant action.

As mentioned above, by adding an anti-gelling agent, a viscosity temperature index improving agent and a metal inactivating agent to the base oil solvent, such characteristics as viscosity and high temperature gelation, and the like, can be further improved.

Other than these, a compound having N-C-S bonds may be used, but in view of solubility in a base material and volatility, benzotriazole derivatives such as Reomet 38, 29, SBT, etc. produced by Ciba Geigy AG are used.

On the basis of 100 parts by weight of the base oil solvent, the components of the base oil solvent are preferably 30 to 90 parts by weight of the hydrogenated poly-α-olefin, 5 to 70 parts by weight of the polyol ester oil, 10 to 20 parts by weight of the antioxidant, 10 to 20 parts by weight of the metal inactivating agent and 25 to 35 parts by weight of the fine magnetic particles. The base oil solvent has a viscosity of preferably 100 cp or less and a saturation magnetization of preferably 150 gauss or more. If the amount of the fine magnetic particles is less than 25 parts by weight, the resulting material does not have a level of magnetization of 150 gauss. If the amount of particles exceeds 35 parts by weight, the viscosity is increased.

Further, the base oil solvent of the above lubricating fluid may contain a dialkyl carbonate (ROCOOR), wherein R represents a $C_{5-20}$ alkyl group.

Suitable dialkyl carbonates include those obtained by the interesterif ication reaction of dimethyl carbonate [$(CH_3O)_2CO$] and a $C_{5-20}$ monovalent alcohol (ROH), and those having a viscosity of about 6.3 to 17.5 cst (at 40° C.) (produced by Mitex K.K., trade name: DIALCARB H2, DIALCARB SR1000/R, etc.). However, it is necessary for the dialkyl carbonate to have good volatility. Further, the above dialkyl carbonate (ROCOOR) may be mixed with the hydrogenated poly-α-olefin.

On the basis of 100 parts by weight of the base oil solvent, the components of the whole lubricating fluid based on 100 parts by weight of the base oil solvent are preferably 40 to 50 parts by weight of dialkyl carbonate, 10 to 30 parts by weight of the hydrogenated poly-α-olefin, 10 to 20 parts by weight of the antioxidant, 10 to 20 parts by weight of the metal inactivating agent, and 25 to 35 parts by weight of the fine magnetic particles. The base oil solvent has a viscosity of preferably 100 cp or less and the saturation magnetization is 150 gauss or more.

A further understanding of the invention may be attained by reference to the Figure in combination with the remarks below.

A spindle motor for HDD (Hard Disk Drive) is shown in the FIGURE and is constituted of a stator assembly 2 fixed on a frame 1. The spindle motor is a part of a magnetic disc device (not shown). Rotor assembly 3 is set over the stator assembly 2. A stator core 21 of stator assembly 2 is firmly fixed to the outer peripheral portion of a bearing holder 22, which is substantially cylindrically shaped and is positioned at the substantially center portion of frame 1. Coils 23 are wound around salient poles of the stator core 21.

At the inner peripheral portion of the bearing holder 22, a pair of integrally formed radial bearings 24 and 24 are positioned at a predetermined distance in the axial direction and a rotary shaft 31 is rotatably supported by these pair of radial bearings 24 and 24. That is, the inner peripheral surface of the radial bearings 24 and 24 confront the outer peripheral surface of the rotary shaft 31 with clearance allowing movement of the shaft with respect to the bearings. A bearing lubricating fluid A provides lubrication between the moving surfaces. On at least one side of the inner peripheral surface of the radial bearings 24 and 24 and the outer peripheral surface of the rotary shaft 31, dynamic pressure generating grooves (not shown) are formed, and the rotary shaft 31 is rotatably supported by the dynamic pressure generated in the bearing lubricating fluid A with the dynamic pressure generating grooves. The bearing lubricating fluid A is the magnetic fluid composition of the present invention. The FIGURE shows a bearing portion in the radial direction.

Further, the bearing portion in the thrust direction is as follows. The end portion of the rotary shaft 31 confronts a thrust receiving plate 25 which covers an open portion of the bottom end side of the bearing holder 22 so as to permit sliding action between members which are lubricated by the same bearing lubricating fluid A. Hereafter, both the bearing portion in the radial direction and the bearing portion in the thrust direction are referred to as a dynamic pressure bearing portion.

Also, at the end portion of the rotary shaft 31, a collar shaped stopper plate 32 made of a magnetic material is fixed, and the whole body of the rotor assembly 3 is prevented from falling from the stator assembly 2 by the stopper plate 32.

The bearing lubricating fluid A in the present example is also used as a magnetic fluid for sealing the bearing lubricating fluid A. That is, at the upper open portion of the bearing holder 22, a sealing portion is provided which is successively connected to the dynamic pressure bearing portion. And from the dynamic pressure bearing portion to the sealing portion, i.e., from the bottom portion of the bearing holder 22 to the vicinity of the upper end opening, the same bearing lubricating fluid A completely fills this region. At the sealing portion, a circular sealing magnet 26 magnetized in the radius direction is provided along the inner peripheral wall of the above sealing portion. By the magnetic absorbing power of the sealing magnet 26, the bearing lubricating fluid A is preserved inside and prevented from flowing to the outside.

More specifically, the inner peripheral surface of the above sealing magnet 26 has a tapered surface 26', and the space between the rotary shaft 31 and the tapered surface 26' gradually narrows from the upper end of the opening to the radial bearing 24 side. The amount of the bearing lubricating fluid A is set so that the liquid surface level of the bearing lubricating fluid A reaches the position of the tapered surface 26'. Thus, the liquid surface level of the bearing lubricating fluid A is set, when the liquid surface level of the bearing lubricating fluid A rises while the motor is rotating, i.e., when the liquid surface moves to the side where the space between the rotary shaft 31 and the tapered surface 26' becomes wide, restraint of movement of the liquid surface works by the change of curvature of the liquid surface. Also, when a magnetic material is used for a rotary shaft 31 and the radial bearing 24, a magnetic loop is formed between the sealing magnet 26, the rotary shaft 31 and the radial bearing 24. And a magnetic flux of the circular sealing magnet 26 magnetized to the radius direction can be concentrated at the narrow side of the space between the sealing magnet 26 and the rotary shaft 31. Therefore, the function of attracting the bearing lubricating fluid A, which is a magnetic fluid to the radial bearing 24 side, is exhibited so that a sealing effect can further be heightened.

Further, at the base end portion of the rotary shaft 31, a hub 33 which is part of rotor assembly 3, is fixed so as to integrally rotate with the rotary shaft 31. The hub 33 is formed as a substantially cylindrical body having the other peripheral portion on which plural magnetic discs 34 are provided. A circular driving magnet 36 is provided through a back yoke 35 at the lower end edge of the hub 33. The driving magnet 36 is closely positioned so as to confront the outer peripheral end surface of the stator core 21.

Also, the center portion of the hub 33 is so positioned as to confront the upper portion of the sealing magnet 26 in the axis direction. The center of the rotor assembly 3 receives a predetermined pressing power in the thrust direction directed to the thrust receiving plate 25 by the attracting power of the pair of magnetic body 33a and 26a which are positioned so as to confront each other.

The following examples provide a description of the magnetic fluid composition which is the bearing lubricating fluid A used in the dynamic pressure bearing device of the present invention.

sodium oleate solution is added to the mixture with stirring. After cooling the mixture to room temperature, 3N aqueous hydrochloric acid solution is added to a pH of 6. Coagulated colloid particles are washed with water sufficiently and dried to prepare Mn-Zn fine ferrite particles coated by oleic acid.

Then, 14.8 g of the Mn-Zn fine ferrite particles coated by oleic acid are separated from the resulting particles and 15 g of the following base oil are added thereto. After dispersing the particles with sufficient stirring, undispersed material is removed by centrifugation and the base oil is added to prepare fluid having a specific gravity of 1.16. The ferrite concentration of the thus obtained fluid is 35 wt % and the saturation magnetization was 250 gauss.

Further, the base oil solvent in which the Mn-Zn fine ferrite magnetic particles, is a mixture of a hydrogenated poly-$\alpha$-olefin [C30 to C40] (Shinflude 401, produced by Shin-nittetsu Kagaku K.K.), dialkyl carbonate (ROCOOR), wherein R is a $C_{5-20}$ alkyl group (produced by Mitsui Sekiyu Kagaku K.K., DIALCARB SR1000/R), diisodecyl adipate oil (HATCOL 2910, produced by Shin-nittetsu Kagaku K.K.) and trioctyl trimellitate oil (HATCOL 2920, produced by Shin-nittetsu Kagaku K.K.). Alkyldiphenyl amine (Irganoz L57, trade name) was added as an amine antioxidant (anti-gelling agent). By varying the amount of the alkyldiphenyl amine anti-gelling agent as shown in Table 1 below, lubricating fluid compositions Examples 1 to 4 were prepared, respectively. Also, lubricating fluid compositions of Comparative Examples 2 to 5 were prepared by using a phenolic antioxidant as the anti-gelling agent.

TABLE 1

| Sample Kind of antioxidant | Comparative Example 1 | Example 3 | Example 4 | Example 1 | Example 2 | Comparative Example 2 | Comparative Example 3 | Comparative Example 4 | Comparative Example 5 |
|---|---|---|---|---|---|---|---|---|---|
| (wt %) | | | | | | | | | |
| Alkyldiphenyl amine (L57) | — | 0.1 | 0.5 | 1.0 | 5.0 | — | — | — | — |
| 2,6-Di-t-butyl phenol (L108) | — | — | — | — | — | 0.5 | 5.0 | — | — |
| 4,4'-Thiobis(2-t-butyl-4-methyl phenol; L115) | — | — | — | — | — | — | — | 0.5 | 5.0 |

First Embodiment In the examples in the first embodiment of the present invention, the fine particles, Mn-Zn ferrite, prepared by the coprecipitation method, having a saturation magnetization of 250 gauss, was used.

The fine magnetic particles are prepared by dissolving 0.1 mol of manganese sulfate, 0.4 mol of zinc sulfate and 0.5 mol of ferric sulfate in one liter of water, adding dropwise 6N sodium hydroxide to the aqueous solution, while maintaining the temperature at 90° C. with stirring, to attain a pH of 11, whereby a colloid of Mn-Zn ferrite is formed. Then, the liquid temperature is adjusted to 80° C., 250 ml of a 10%

The prepared lubricating fluid compositions were each placed in a petri dish and the stabilities of the dispersed states were evaluated by observing appearances such as the presence or absence of precipitation, aggregation, separation, and the like. Further, each composition was allowed to stand at a temperature of 80° C. for 520 hours and the volatility weight loss was determined. Moreover, the gel time was measured by subjecting each composition to a temperature of 140° C. As for the viscosity, a viscosity and viscosity temperature index at 25° C. were determined. The results are shown in Table 2.

TABLE 2

| Sample Magnetic fluid characteristics | Comparative Example 1 | Example 3 | Example 4 | Example 1 | Example 2 | Comparative Example 2 | Comparative Example 3 | Comparative Example 4 | Comparative Example 5 |
|---|---|---|---|---|---|---|---|---|---|
| Dispersion stability (precipitation, etc) | ○ | ○ | ○ | ○ | ○ | ○ | X | ○ | X |
| Viscosity cp at 25° C. | 60 | 60 | 62 | 63 | 64 | 61 | — | 64 | — |
| Volatility weight loss (wt %) | 0.89 | 0.89 | 0.91 | 0.92 | 1.12 | 1.17 | — | 0.91 | — |
| Gelation preventive effect (antioxidation lifetime) | 100 | 150 | 180 | 300 | 500 | 100 | — | 100 | — |

In Table 2, the composition of Comparative Example 1 contained no anti-gelling agent, while the compositions of Examples 3 and 4 contained small amounts of amine antioxidant as an anti-gelling agent. That is, in Example 3, 0.1% by weight of alkyldiphenyl amine (L57), as the amine antioxidant (anti-gelling agent), was used and, in Example 4, 0.5% by weight of alkyldiphenyl amine (L576) was added. Even though the compositions of Examples 3 and 4 contained only small amounts of the amine antioxidant (anti-gelling agent), improvement in the viscosity and volatility weight characteristics were not observed, but high temperature gelation preventive effects (effect of antioxidation) could be observed. This is believed attributable to the interactive effect of the amine antioxidant (anti-gelling agent), and a surfactant. Also, when the amine antioxidant (anti-gelling agent) was added in amounts exceeding 0.5% by weight, it was found that the characteristics of viscosity, volatility weight loss and high temperature gelation preventive effect were all improved.

On the other hand, no high temperature gelation preventive effects (effect of antioxidation) could be observed when only small amounts of an anti-gelling agent (antioxidant) other than the amine type was added. For example, in the composition of Comparative Example 2, wherein a small amount (0.5% by weight) of 2,6-di-t-butylphenol (trade name; Ethyl 701, Irganox L108, etc.) was added as a phenolic anti-gelling agent (antioxidant), or that of Comparative Example 4 wherein a small amount (0.5% by weight) of 4,4'-thiobis (2-t-butyl-4-methylphenol (L115)) was added as a sulfur containing anti-gelling agent (antioxidant), very little improvement in viscosity and volatility weight was observed and no improvement was observed in high temperature gelation preventive effect (effect of antioxidation).

The magnetic fluid compositions of Example 1 and Example 2, contained 1.0% by weight and 5.0% by weight respectively of alkyldiphenylamine (L57) anti-gelling agent (antioxidant). Thus, in Example 1 and Example 2 to each of which a large amount of the amine anti-gelling agent (amine antioxidant) was added, the characteristics of viscosity, volatility weight and high temperature gelation preventing effect (antioxidation lifetime) exhibited preferred values and particularly, an improved high temperature gelation preventing effect (antioxidation effect). Thus, the high temperature stability of these Examples is excellent.

To the contrary, as shown in Comparative Example 3 or Comparative Example 5, when a type of anti-gelling agent other than the amine anti-gelling agent is added in a large amount, the find ferromagnetic particles do not dissolve in the liquid dispersion solvent and no magnetic fluid composition can be obtained.

Second Embodiment

In the second embodiment of the present invention the Mn-Zn ferrite prepared by the coprecipitation method is used as the fine magnetic particles.

The preparation of the fine magnetic particles is carried out as follows. In 10 liters of water are dissolved 200 g of manganese chloride, 220 g of zinc chloride and 520 g of iron trichloride, and while maintaining the temperature of the solution at 95° C. with stirring, 6N sodium hydroxide is added dropwise to the solution to a pH of 11, thereby forming a colloid of Mn-Zn ferrite. After adjusting the temperature of the liquid to 80° C., while further stirring the liquid, 2 liters of a 10% sodium oleate solution is added to the liquid. After cooling the liquid to room temperature, 3N hydrochloric acid is added thereto to adjust the pH to 6. Aggregated colloidal particles are washed sufficiently with water and dried thereby preparing Mn-Zn fine ferrite particles coated by oleic acid.

Then, 14.8 g of the Mn-Zn fine ferrite particles coated by oleic acid are taken from the above obtained product and 15 g of the following base oil solvent are added, and the mixture is stirred sufficiently to disperse the particles and undispersed materials are removed by ultrafiltration. Next, the base oil is added until the specific gravity of the liquid becomes 1.16 to prepare the fluid. The thus obtained fluid has a ferrite concentration of 35 wt % and a saturation magnetization of 250 gauss.

Further, the base oil solvent in which the Mn-Zn ferrite fine magnetic particles are dispersed, is a mixture of a hydrogenated poly-α-olefin [C30 to C40] (Shinflude 401, produced by Shin-nittestu Kagaku K.K.), valeric acid and heptanoic acid mixed trimethylolpropane ester (HATCOL 2937, produced by Shin-nittestu Kagaku K.K.), diisodecyl adipate oil (HATCOL 2910, produced by Shin-nittestu Kagaku K.K.) and trioctyl trimellitate oil (HATCOL 2920, produced by Shin-nittestu Kagaku K.K.), to which an antioxidant (alkyldiphenylamine, Irganox L57,), a viscosity index improving agent (OLICAT-M, produced by OSWALD BOLL CO.), and a metal inactivating agent (Reomet 39, produced by Ciba Geigy AG) are added.

By changing the ratio of each element in the base oil solvent as shown in the following Table 3, lubricating fluid compositions of Example 5 to 9 and Comparative Examples 6 to 9 were prepared.

TABLE 3

| Sample | Example 5 | Example 6 | Comparative Example 6 | Comparative Example 7 | Comparative Example 8 | Comparative Example 9 | Example 7 | Example 8 | Example 9 |
|---|---|---|---|---|---|---|---|---|---|
| Poly-α-olefin PA0401 | Bal | Bal | Bal | Bal | Bal | Bal | Bal | Bal | Bal |
| Polyol ester H2937 | 10 | 30 | 80 | — | — | — | 30 | 30 | 30 |
| Diester H2910 | — | — | — | — | 30 | — | — | — | — |
| Triester H2920 | — | — | — | — | — | 30 | — | — | — |
| Anti-oxidant L57 | 5 | 5 | 5 | 5 | 5 | 5 | 5 | 5 | — |
| Viscosity temperature index improving agent | 5 | 5 | 5 | 5 | 5 | 5 | 5 | — | — |
| Metal inactivating agent | 0.05 | 0.05 | 0.05 | 0.05 | 0.05 | 0.05 | — | — | — |

In Table 3, "Bal" refers to the component of the fluid which is the remaining amount of the fluid.

The prepared lubricating fluid compositions were each placed in a petri dish and the stabilities of the dispersed states of the fine magnetic particles was evaluated by observing the appearance of presence or absence of precipitation, aggregation, separation, and the like. Further, each composition was allowed to stand at a temperature of 80° C. for 520 hours and the volatility weight loss was measured. Moreover, the gel time was measured by adjusting each composition to a temperature of 140° C. As for the viscosity, the viscosity and viscosity temperature index at 25° C. were determined for each fluid. The results are shown in Table 4.

the polyol ester was used, viscosity characteristics and volatility characteristics were unacceptable.

In the sample of Example 7 in which the metal inactivating agent had been removed from Example 6, the characteristics exhibited good values but the high temperature gel time was slightly diminished and it was found that the high temperature gel time could be elongated by addition of the metal inactivating agent.

Also, in the sample of Example 8 in which the viscosity temperature index improving agent had been removed from the sample of Example 7, the characteristics showed good values, but the viscosity characteristics were slightly diminished as a matter of course. It was found that the viscosity characteristics could be improved by addition of the viscosity temperature index improving agent.

TABLE 4

| Sample Magnetic fluid characteristics | Example 5 | Example 6 | Comparative Example 6 | Comparative Example 7 | Comparative Example 8 | Comparative Example 9 | Example 7 | Example 8 | Example 9 |
|---|---|---|---|---|---|---|---|---|---|
| Dispersion stability | ○ | ○ | Δ | ○ | ○ | ○ | ○ | ○ | ○ |
| Viscosity cp at 25° C. | 66 | 72 | — | 60 | 58 | 212 | 72 | 67 | 65 |
| Volatility weight loss (wt %) | 0.12 | 0.08 | — | 0.14 | 1.67 | 0.06 | 0.08 | 0.08 | 0.07 |
| Viscosity temperature index | 179 | 171 | — | 184 | 158 | 173 | 179 | 148 | 154 |
| High temperature gelation (lifetime) | 240 | 300 | — | 100 | 140 | 300 | 290 | 290 | 210 |

In Table 4, the characteristics of dispersion stability, viscosity, volatility loss, viscosity temperature index and high temperature gel time for the samples of Examples 5 and 6 in the second embodiment, showed preferred values, and particularly in Example 6 in which the amount of the polyol ester is increased in the range of 70 wt %, the high temperature gel time was very large and thus it was found that the sample had excellent high temperature stability.

To the contrary, for Comparative Example 5 in which the polyol ester was mixed in an amount exceeding 70 wt %, the fine magnetic particles could be difficultly dispersed. Also, in Comparative Example 7 in which the polyol ester was not mixed, the mixture could be dispersed but the composition gelled within a short time at high temperature. Further, in Comparative Examples 8 and 9 wherein an ester other than Further, in the sample of Example 9 in which the antioxidant had been removed from the sample of Example 8, the characteristics showed relatively good values but the high temperature gel time had markedly dropped. It was found that the high temperature gel time could be materially increased by addition of the antioxidant.

Third Embodiment

Mn-Zn ferrite fine magnetic particles are added to one of the following materials or a mixture of two materials selected from the group consisting of a hydrogenated poly-α-olefin [C30 to C40] (Shinflude 401, produced by Shin-nittestu Kagaku K.K.), a dialkyl carbonate (ROCOOR), where R represents a $C_{5-20}$ alkyl group (DIALCARB SR 1000/R, produced by Mitsui Sekiyu Kagaku K.K.), a diisodecyl adipate oil (HATCOL 2910, produced by Shin-nittestu Kagaku K.K.) and trioctyl trimellitate oil (HATCOL 2920, produced by Shin-nittestu Kagaku K.K.), to which an anti-oxidant (alkyldiphenylamine, Irganox L57, trade name), a viscosity index improving agent (OLICAT-M, produced by OSWALD BOLL CO.), and a metal inactivating agent (Reomet 39, produced by Ciba Geigy AG) are added. By changing the ratio of each element in the base oil solvent as shown in the following Table 5, the lubricating fluid compositions of Examples 10 to 14 and Comparative Examples 10 to 13 were each prepared.

values, and in particular, Example 10, in which the amount of the dialkylcarbonate is increased, the high temperature gel time is very large and thus the sample exhibits excellent high temperature stability. However, for Comparative Examples 10 and 11, in which another ester is used in an increased amount without using the dialkylcarbonate, dispersion of the fine magnetic particles was impossible.

Also, in Comparative Examples 12 and 13, in which another ester is used in a lesser amount, without the copresence of the dialkylcarbonate, in combination with the hydro-

TABLE 5

| Sample | (wt %) | | | | | | | | |
|---|---|---|---|---|---|---|---|---|---|
| | Example 10 | Example 11 | Comparative Example 10 | Comparative Example 11 | Comparative Example 12 | Comparative Example 13 | Example 12 | Example 13 | Example 14 |
| Poly-α-olefin PA0401 | — | Bal | — | — | Bal | Bal | — | — | — |
| Dialkyl carbonate SR 1000 | Bal | 50 | — | — | — | — | Bal | Bal | Bal |
| Diester H2910 | — | — | Bal | — | 50 | — | — | — | — |
| Triester H2920 | — | — | — | Bal | — | 50 | — | — | — |
| Anti-oxidant | 5 | 5 | 5 | 5 | 5 | 5 | 5 | 5 | — |
| Viscosity temperature index improving agent | 5 | 5 | 5 | 5 | 5 | 5 | 5 | — | — |
| Metal inactivating agent | 0.05 | 0.05 | 0.05 | 0.05 | 0.05 | 0.05 | — | — | — |

In Table 5, "Bal" refers to the component of the fluid which is the remaining amount of the fluid.

The prepared lubricating fluid compositions were each placed in a petri dish and the stabilities of the dispersed states of the fine magnetic fine particles were evaluated by observing the appearance of the presence or absence of precipitation, aggregation, separation, and the like. Further, each composition was allowed to stand at a temperature of 80° C. for 520 hours and the volatility weight loss was determined. Moreover, the gel time was measured by adjusting each composition to a temperature of 140° C. As for the viscosity, the viscosity and viscosity temperature index at 25° C. were determined for each composition. The results are shown in Table 6.

genated poly-α-olefin the mixture could be dispersed but the composition exhibited unacceptable characteristics such as the viscosity and volatility weight.

Further, in the sample of Example 12, prepared by removing the metal inactivating agent from the composition of Example 10, the characteristics exhibited good values, but the high temperature gel time was slightly diminished, and it was found that the high temperature gel time could be lengthened by addition of the metal inactivating agent.

Also, in the sample of Example 13, prepared by removing the viscosity temperature index improving agent from the sample of Example 12, the characteristics exhibited good values, but the viscosity characteristics had slightly diminished as a matter of course, and it was found that the

TABLE 6

| Sample Magnetic fluid characteristics | (wt %) | | | | | | | | |
|---|---|---|---|---|---|---|---|---|---|
| | Example 10 | Example 11 | Comparative Example 10 | Comparative Example 11 | Comparative Example 12 | Comparative Example 13 | Example 12 | Example 13 | Example 14 |
| Dispersion stability | ○ | ○ | X | X | ○ | ○ | ○ | ○ | ○ |
| Viscosity cp at 25° C. | 90 | 81 | — | — | 58 | 212 | 90 | 87 | 85 |
| Volatility weight loss (wt %) | 0.08 | 0.11 | — | — | 1.67 | 0.06 | 0.08 | 0.08 | 0.07 |
| Viscosity temperature index | 164 | 171 | — | — | 158 | 173 | 164 | 122 | 120 |
| High temperature gelation (lifetime) | 300 | 280 | — | — | 140 | 300 | 290 | 290 | 180 |

As shown in Table 6, the samples of Examples 10 and 11 of the third embodiment, the characteristics of dispersion stability, viscosity, volatility loss, viscosity temperature index and high temperature gel time exhibit preferred viscosity characteristics could be improved by addition of the viscosity temperature index improving agent.

Further, in the sample of Example 14, prepared by removing the antioxidant from the sample of Example 13, the characteristics exhibited relatively good values, but the high temperature gel time had markedly decreased. It was found that the high temperature gel time could be markedly lengthened by addition of the antioxidant.

Also, whereas the lifetime of the dynamic pressure bearing motor using the conventional lubricating fluid is about 20,000 hours, the lifetime of the dynamic pressure bearing motor using the amine anti-gelling agent of the present invention is improved to 100,000 hours or more.

It should also be noted that the material of the fine magnetic particles, besides Mn-Zn ferrite, can be Ni-Zn ferrite or magnetite. Also, any other higher fatty acid can be employed as a surfactant. Moreover, an amine, phenolic or sulfur containing compound, other than the above-mentioned antioxidant, may be used as the anti-gelling agent.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A motor have a dynamic pressure bearing device equipped with a rotor having a driving coil or a driving magnetic, and a stator having the other of the driving coil or the driving magnet, said dynamic pressure bearing device comprising:
    a shaft fixed to said rotor or said stator and having a dynamic pressure surface on its outer surface,
    a bearing body fixed to the other of said rotor or stator and having a dynamic pressure surface on its inner surface which is positioned to circumferentially confront said outer surface of said shaft body,
    a dynamic pressure generating surface formed on at least one side of both said dynamic pressure surfaces, and
    a lubricating fluid, in which magnetic particles are dispersed in a base oil solvent comprising a dialkylcarbonate (ROCOOR), a hydrogenated poly-alpha-olefin and an amine anti-gelling agent, interposed between both of said dynamic pressure surfaces.

2. A motor having a dynamic pressure bearing device equipped with a rotor having a driving coil or a driving magnet, and a stator having the other of the driving coil or the driving magnet, said dynamic pressure bearing device comprising:
    a shaft fixed to said rotor or said stator and having a dynamic pressure surface on its outer surface,
    a bearing body fixed to the other of said rotor or stator and having a dynamic pressure surface on its inner surface which is positioned to circumferentially confront said outer surface of said shaft body,
    a dynamic pressure generating surface formed on at least one side of both said dynamic pressure surfaces, and
    a lubricating fluid in which magnetic particles are dispersed in a base oil solvent comprising a dialkylcarbonate (ROCOOR) and a hydrogenated poly-$\alpha$-olefin and containing an amine anti-gelling agent interposed between both of said dynamic pressure surfaces.

3. A motor having a dynamic pressure bearing device equipped with a rotor having a driving coil or a driving magnet, and a stator having the other of the driving coil or the driving magnet, said dynamic pressure bearing device comprising:
    a shaft fixed to said rotor or said stator and having a dynamic pressure surface on its outer surface,
    a bearing body fixed to the other of said rotor or stator and having a dynamic pressure surface on its inner surface which is positioned to circumferentially confront said outer surface of said shaft body,
    a dynamic pressure generating surface formed on at least one side of both said dynamic pressure surfaces, and
    a lubricating fluid in which magnetic particles are dispersed in a base oil solvent comprising less than 70% polyol ester in combination with hydrogenated poly-$\alpha$-olefin and containing an amine anti-gelling agent, interposed between both of said dynamic pressure surfaces.

* * * * *